US012648005B2

(12) United States Patent
Hwang et al.

(10) Patent No.: US 12,648,005 B2
(45) Date of Patent: Jun. 2, 2026

(54) METHOD FOR TRANSMITTING AND RECEIVING PSSCH IN WIRELESS COMMUNICATION SYSTEM, AND DEVICE THEREFOR

(71) Applicant: LG Electronics Inc., Seoul (KR)

(72) Inventors: Daesung Hwang, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 18/282,437

(22) PCT Filed: Mar. 15, 2022

(86) PCT No.: PCT/KR2022/003584
§ 371 (c)(1),
(2) Date: Sep. 15, 2023

(87) PCT Pub. No.: WO2022/197060
PCT Pub. Date: Sep. 22, 2022

(65) Prior Publication Data
US 2024/0188099 A1    Jun. 6, 2024

(30) Foreign Application Priority Data

Mar. 16, 2021   (KR) ........................ 10-2021-0034178
Aug. 2, 2021   (KR) ........................ 10-2021-0101495

(51) Int. Cl.
*H04W 72/25*       (2023.01)
*H04W 72/0446*     (2023.01)
*H04W 72/0453*     (2023.01)

(52) U.S. Cl.
CPC ....... *H04W 72/25* (2023.01); *H04W 72/0446* (2013.01); *H04W 72/0453* (2013.01)

(58) Field of Classification Search
CPC ............. H04W 72/25; H04W 72/0446; H04W 72/0453; H04W 72/02; H04W 92/18;
(Continued)

(56) References Cited

U.S. PATENT DOCUMENTS 12,022,503 B2 *   6/2024   Park .................... H04L 41/0803
12,069,616 B2 *   8/2024   Zhao ........................ H04W 4/46
(Continued)

FOREIGN PATENT DOCUMENTS

WO      WO 2017176099      10/2017

OTHER PUBLICATIONS

Apple, "Inter-UE Coordination for Mode 2 Resource Allocation," 3GPP TSG RAN WG1 #104-e, R1-2101358, e-Meeting, Jan. 25-Feb. 5, 2021, 8 pages.
(Continued)

*Primary Examiner* — Brian T O Connor
(74) *Attorney, Agent, or Firm* — Fish & Richardson P.C.

(57)              ABSTRACT

The present disclosure proposes a method for transmitting and receiving a PSSCH in a wireless communication system, and a device therefor. The method, carried by first user equipment, may comprise the steps of: determining an SL resource on the basis of a set of preferred resources or a set of non-preferred resources related to second user equipment; transmitting, on the basis of the SL resource, a PSCCH including SCI to the second user equipment; and transmitting, on the basis of the SCI, the PSSCH to the second user equipment.

8 Claims, 13 Drawing Sheets

(58) Field of Classification Search
CPC . H04W 72/563; H04W 72/121; H04W 72/20;
H04W 72/40; H04W 4/40
See application file for complete search history.

(56) References Cited

U.S. PATENT DOCUMENTS

| | | | |
|---|---|---|---|
| 12,143,966 B2 * | 11/2024 | Farag ................... | H04L 1/1864 |
| 12,213,160 B2 * | 1/2025 | Wu ........................ | H04L 5/0094 |
| 12,245,199 B2 * | 3/2025 | Hui ....................... | H04W 72/02 |
| 12,302,308 B2 * | 5/2025 | Hwang .................. | H04W 4/40 |
| 2020/0305127 A1 | 9/2020 | Huang et al. | |
| 2022/0007210 A1 * | 1/2022 | Yokomakura ..... | H04W 72/0453 |
| 2022/0232530 A1 * | 7/2022 | Chae .................... | H04W 72/02 |
| 2022/0240265 A1 * | 7/2022 | Sarkis .................. | H04L 5/0037 |
| 2023/0337192 A1 * | 10/2023 | Farag ................... | H04L 1/1671 |
| 2023/0389051 A1 * | 11/2023 | Leon Calvo .......... | H04W 72/25 |
| 2024/0080866 A1 * | 3/2024 | Luo ....................... | H04W 72/25 |
| 2024/0298344 A1 * | 9/2024 | Park ....................... | H04L 43/16 |

OTHER PUBLICATIONS

Moderator (LG Electronics), "Summary for AI 8.11.2.2 Feasibility and benefits for mode 2 enhancements," #3GPP TSG RAN WG1 #102-e, R1-2007412, e-Meeting, Aug. 17-28, 2020, 33 pages.
Nokia, Nokia Shanghai Bell, "Discussion of sidelink resource allocation mode 2 enhancements," 3GPP TSG RAN WG1#102-e, R1-2005501, e-Meeting, Aug. 17-28, 2020, 5 pages.

* cited by examiner

BS(e. g. eNB or gNB)

Figure 16:
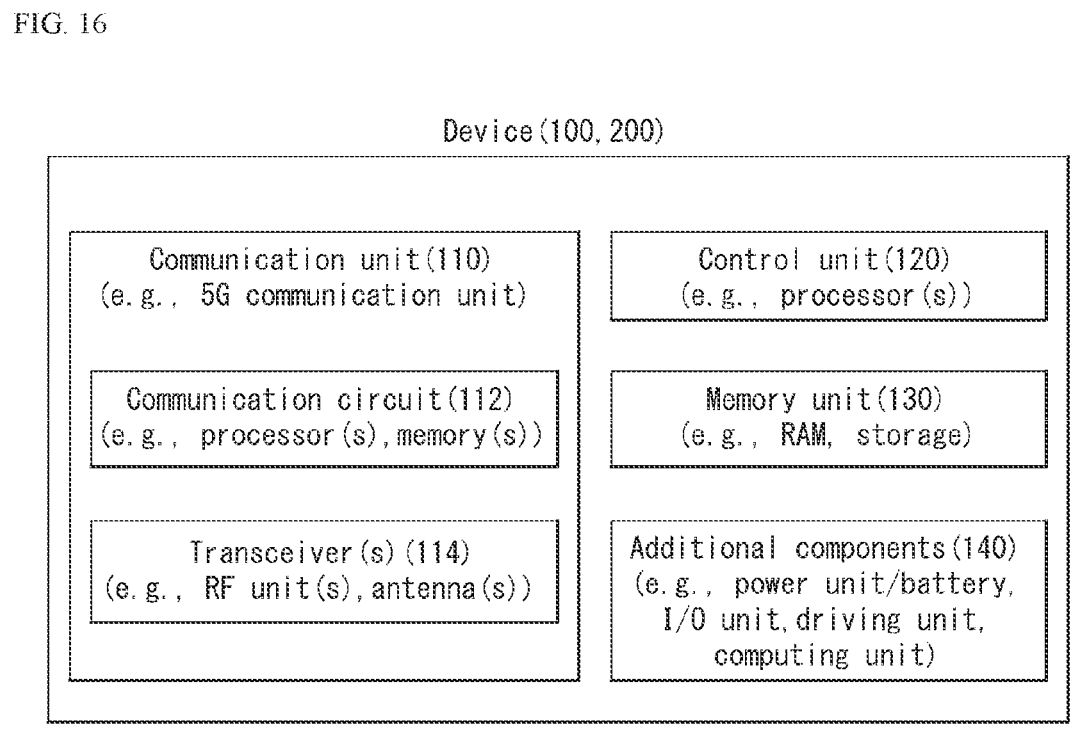

Device(100, 200)

Communication unit(110)
(e.g., 5G communication unit)

Communication circuit(112)
(e.g., processor(s),memory(s))

Transceiver(s)(114)
(e.g., RF unit(s),antenna(s))

Control unit(120)
(e.g., processor(s))

Memory unit(130)
(e.g., RAM, storage)

Additional components(140)
(e.g., power unit/battery,
I/O unit,driving unit,
computing unit)

METHOD FOR TRANSMITTING AND RECEIVING PSSCH IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2022/003584, filed on Mar. 15, 2022, which claims the benefit of Korean Patent Application No. 10-2021-0034178, filed on Mar. 16, 2021, and Korean Patent Application No. 10-2021-0101495, filed on Aug. 2, 2021. The disclosures of the prior applications are incorporated by reference in their entirety.

TECHNICAL FIELD

The present disclosure relates to a wireless communication system, and more specifically, to a method for transmitting and receiving a physical sidelink control channel (PSCCH) and/or a physical sidelink shared channel (PSSCH) and a device therefor.

BACKGROUND ART

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Meanwhile, techniques for efficiently using resources between a first user equipment (UE) and a second user equipment (UE) in SL communication are being discussed.

DISCLOSURE

Technical Problem

The present disclosure proposes a method for defining a set of preferred resources and/or a set of non-preferred resources indicated from a second user equipment (UE) to a first user equipment (UE) and a device therefor.

In addition, the present disclosure proposes a method for transmitting and receiving assistance information including information on a set of preferred resources and/or information on a set of non-preferred resources and a device therefor.

In addition, the present disclosure proposes a method for requesting assistance information and a device therefor.

The technical problems to be achieved by the present disclosure are not limited to the technical problems mentioned above, and other technical problems not mentioned will be clearly understood by those skilled in the art to which the present disclosure pertains from the following descriptions.

Technical Solution

This disclosure proposes a method of transmitting a physical sidelink shared channel (PSSCH) in a wireless communication system. The method performed by a first user equipment (UE) may comprise determining a sidelink (SL) resource based on a set of preferred resources or a set of non-preferred resources related to a second user equipment (UE), wherein the set of preferred resources or the set of non-preferred resources is included in a slot set related to SL transmission in time domain, and the slot set related to the SL transmission does not include at least one of a slot related to a synchronization signal block (SSB) and/or a reserved slot in a resource pool configuration, transmitting a physical sidelink control channel (PSCCH) including sidelink control information (SCI) to the second UE based on the SL resource, and transmitting the PSSCH to the second UE based on the SCI In addition, in the above method of the present disclosure, the present disclosure may further comprise receiving assistance information including information on the set of preferred resources or the set of non-preferred resources from the second UE.

In addition, in the above method of the present disclosure, the set of preferred resources or the set of non-preferred resources may be included in an SL bandwidth part (BWP) in frequency domain.

In addition, in the above method of the present disclosure, the set of preferred resources or the set of non-preferred resources may be configured based on a resource block (RB) of a lowest index included in the SL BWP, or to at least one subchannel among a plurality of subchannels included in the SL BWP.

In addition, in the above method of the present disclosure, the present disclosure may further comprise requesting the assistance information from the second UE based on availability of the assistance information by the first UE, or based on the first UE operating in sidelink resource allocation mode 2.

In addition, a first user equipment (UE) configured to transmit a physical sidelink shared channel (PSSCH) in a wireless communication system, the first UE may comprise at least one transceiver, at least one processor, and at least one memory operably connected to the at least one processor, and storing instructions for performing operations based on being executed by the at least one processor, wherein the operations may include determining a sidelink (SL) resource based on a preferred resource set or a set of non-preferred resources related to a second user equipment (UE), wherein the preferred resource set or the set of non-preferred resources is included in a slot set related to SL transmission in time domain, and the slot set related to the SL transmission does not include at least one of a slot related to a synchronization signal block (SSB) and/or a reserved slot in a resource pool configuration, transmitting a physical sidelink control channel (PSCCH) including sidelink control information (SCI) to the second UE based on the SL resource, and transmitting the PSSCH to the second UE based on the SCI.

In addition, in the first UE of the present disclosure, the present disclosure may further comprise receiving assistance information including information on the set of preferred resources or the set of non-preferred resources from the second UE.

In addition, in the first UE of the present disclosure, the set of preferred resources or the set of non-preferred resources may be included in an SL bandwidth part (BWP) in frequency domain.

In addition, in the first UE of the present disclosure, the set of preferred resources or the set of non-preferred resources may be configured based on a resource block (RB) of a lowest index included in the SL BWP, or to at least one subchannel among a plurality of subchannels included in the SL BWP.

In addition, the present disclosure proposes a method of receiving a physical sidelink shared channel (PSSCH) in a wireless communication system. The method performed by a second user equipment (UE) may comprise receiving a physical sidelink control channel (PSCCH) including sidelink control information (SCI) from a first user equipment (UE) based on sidelink (SL) resource, wherein the SL resource is determined based on a set of preferred resources or a set of non-preferred resources related to the second UE, the set of preferred resources or the set of non-preferred resources is included in a slot set related to SL transmission in time domain, and the slot set related to the SL transmission does not include at least one of a slot related to a synchronization signal block (SSB) and/or a reserved slot in a resource pool configuration, and receiving the PSSCH from the first UE based on the SCI.

In addition, in the method of the present disclosure, the present disclosure may further comprise transmitting assistance information including information on the set of preferred resources or the set of non-preferred resources to the first UE.

In addition, in the method of the present disclosure, the set of preferred resources or the set of non-preferred resources may be included in an SL bandwidth part (BWP) in frequency domain.

In addition, in the method of the present disclosure, the set of preferred resources or the set of non-preferred resources may be configured based on a resource block (RB) of a lowest index included in the SL BWP, or to at least one subchannel among a plurality of subchannels included in the SL BWP.

In addition, in the method of the present disclosure, the present disclosure may further comprise receiving a request for the assistance information from the first UE based on availability of the assistance information by the first UE, or based on the UE operating in sidelink resource allocation mode 2.

In addition, a second user equipment (UE) configured to receive a physical sidelink shared channel (PSSCH) in a wireless communication system, the second UE may comprise at least one transceiver, at least one processor, and at least one memory operably connected to the at least one processor, and storing instructions for performing operations based on being executed by the at least one processor, wherein the operations may include receiving a physical sidelink control channel (PSCCH) including sidelink control information (SCI) from a first user equipment (UE) based on sidelink (SL) resource, wherein the SL resource is determined based on a set of preferred resources or a set of non-preferred resources related to the second UE, the set of preferred resources or the set of non-preferred resources is included in a slot set related to SL transmission in time domain, and the slot set related to the SL transmission does not include at least one of a slot related to a synchronization signal block (SSB) and/or a reserved slot in a resource pool configuration, and receiving the PSSCH from the first UE based on the SCI.

In addition, in the second UE of the present disclosure, the present disclosure may further comprise transmitting assistance information including information on the set of preferred resources or the set of non-preferred resources to the first UE.

In addition, in the second UE of the present disclosure, the set of preferred resources or the set of non-preferred resources may be included in an SL bandwidth part (BWP) in frequency domain.

In addition, in the second UE of the present disclosure, the set of preferred resources or the set of non-preferred resources may be configured based on a resource block (RB) of a lowest index included in the SL BWP, or to at least one subchannel among a plurality of subchannels included in the SL BWP.

In addition, a processing apparatus configured to control a first user equipment (UE) to transmit a physical sidelink shared channel (PSSCH) in a wireless communication system of the present disclosure, the processing apparatus may comprise at least one processor, and at least one memory operably connected to the at least one processor, and storing instructions for performing operations based on being executed by the at least one processor, wherein the operations may include determining a sidelink (SL) resource based on a set of preferred resources or a set of non-preferred resources related to a second user equipment (UE), wherein the set of preferred resources or the set of non-preferred resources is included in a slot set related to SL transmission in time domain, and the slot set related to the SL transmission does not include at least one of a slot related to a synchronization signal block (SSB) and/or a reserved slot in a resource pool configuration, transmitting a physical sidelink control channel (PSCCH) including sidelink control information (SCI) to the second UE based on the SL resource, and transmitting the PSSCH to the second UE based on the SCI.

In addition, a computer-readable storage medium storing at least one instruction, wherein the least one instruction causes at least one processor to control operations based on being executed by the at least one processor of the present disclosure, wherein the operations may include determining a sidelink (SL) resource based on a set of preferred resources or a set of non-preferred resources related to a user equipment (UE), wherein the set of preferred resources or the set of non-preferred resources is included in a slot set related to SL transmission in time domain, and the slot set related to the SL transmission does not include at least one of a slot related to a synchronization signal block (SSB) and/or a reserved slot in a resource pool configuration, transmitting a physical sidelink control channel (PSCCH) including sidelink control information (SCI) to the UE based on the SL resource, and transmitting a physical sidelink shared channel (PSSCH) to the UE based on the SCI.

Advantageous Effects

According to the present disclosure, by defining a set of preferred resources and/or a set of non-preferred resources indicated from a second user equipment (UE) to a first user equipment (UE), there is an effect of efficiently using resources in SL communication.

In addition, according to the present disclosure, by transmitting and receiving assistance information including information on a set of preferred resources and/or information on a set of non-preferred resources, there is an effect of implementing a low-latency and high-reliability communication system.

In addition, according to the present disclosure, by requesting assistance information only where it is available, there is an effect of improving unnecessary waste of resources.

Effects which can be obtained in the present disclosure are not limited to the aforementioned advantages and other unmentioned effects will be clearly understood by those skilled in the art from the following description.

DESCRIPTION OF DRAWINGS

Accompanying drawings included as a part of the detailed description for helping understand the present disclosure provide embodiments of the present disclosure and are provided to describe technical features of the present disclosure with the detailed description.

FIG. 16 shows another example of a wireless device based on an embodiment of the present disclosure.

MODE FOR INVENTION

In various embodiments of the present disclosure, "/" and "," should be interpreted as indicating "and/or". For example, "A/B" may mean "A and/or B". Furthermore, "A, B" may mean "A and/or B". Furthermore, "A/B/C" may mean "at least one of A, B and/or C". Furthermore, "A, B. C" may mean "at least one of A. B and/or C".

In various embodiments of the present disclosure. "or" should be interpreted as indicating "and/or". For example, "A or B" may include "only A", "only B", and/or "both A and B". In other words, "or" should be interpreted as indicating "in addition or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

Figure 1:
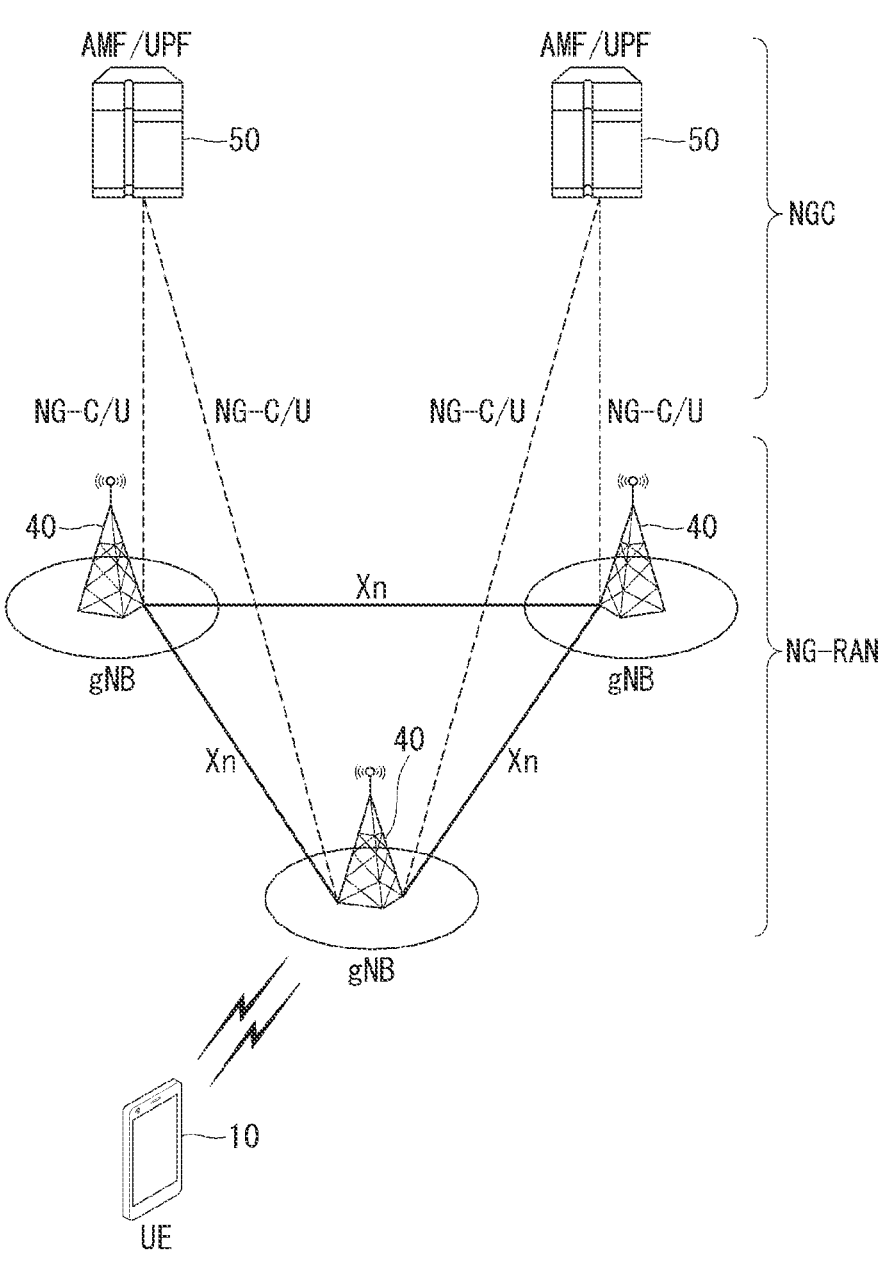
FIG. 1 shows a structure of an NR system, based on an embodiment of the present disclosure.

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
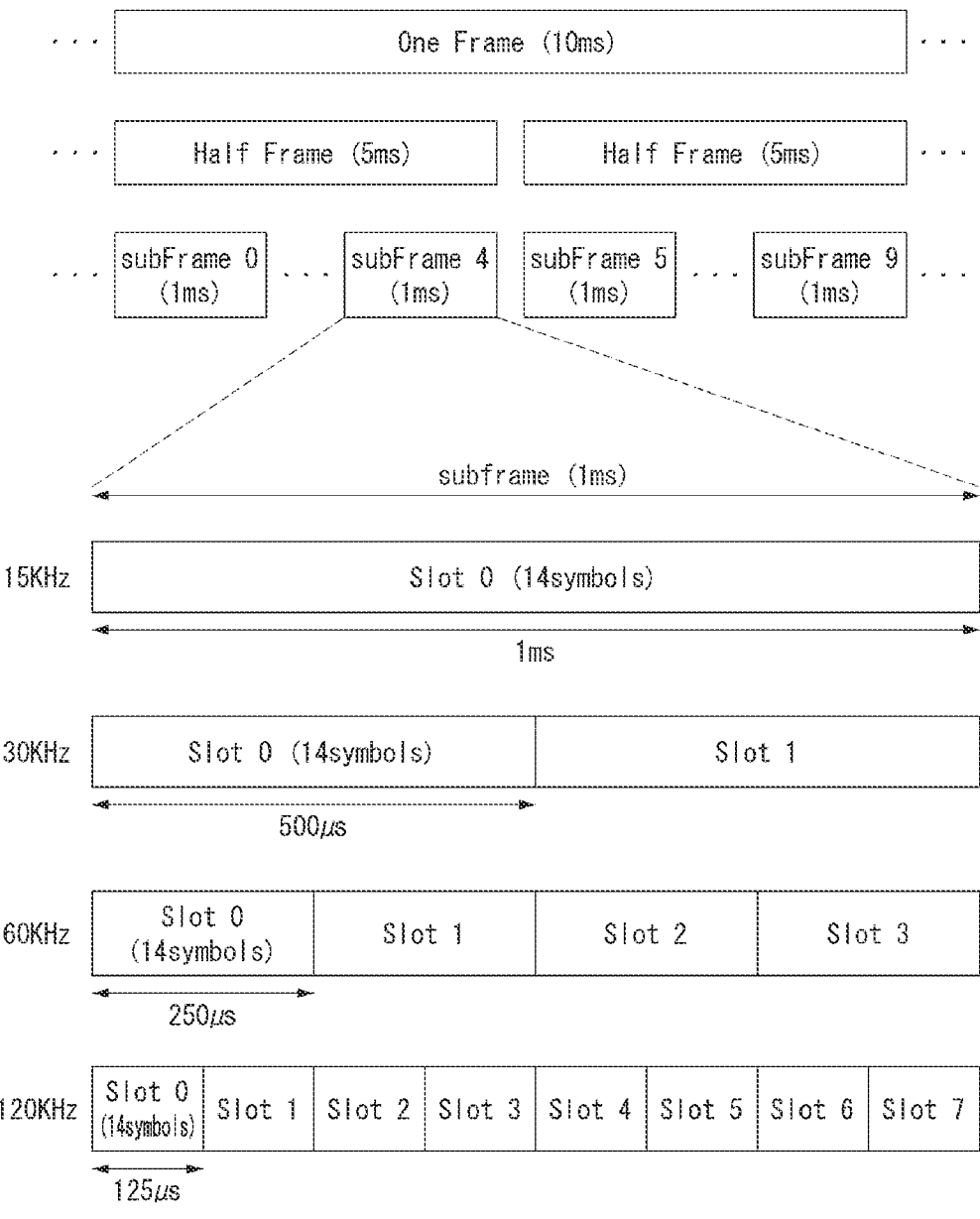
FIG. 2 shows a structure of a radio frame of an NR, based on an embodiment of the present disclosure.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
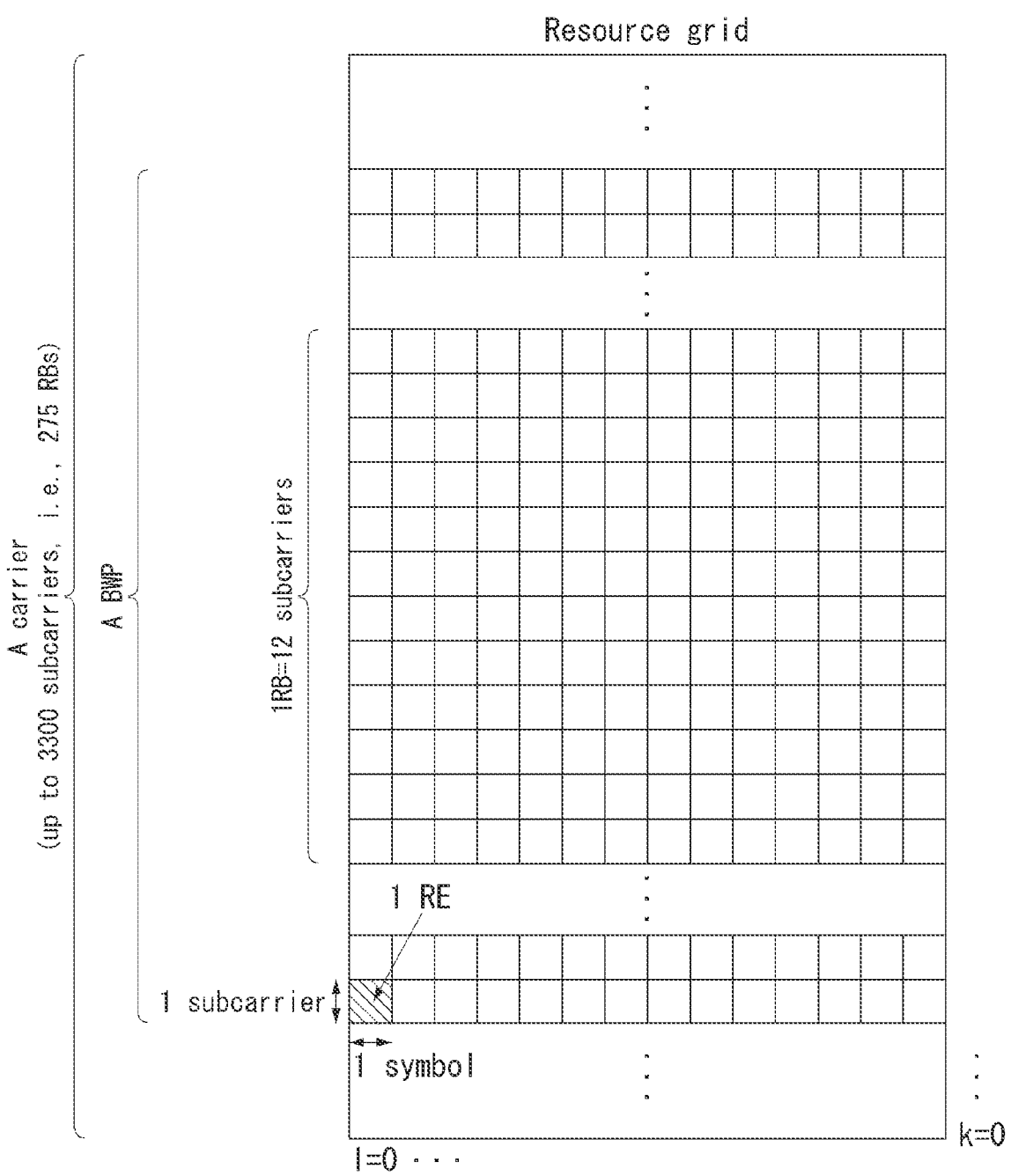
FIG. 3 shows a structure of a slot of an NR frame, based on an embodiment of the present disclosure.

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a sidelink synchronization signal (SLSS) and synchronization information will be described.

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) config- ured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Meanwhile, a plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 KHz in FR1, the transmitting UE may transmit 1 or 2 S-SSBs to the receiving UE within one S-SSB transmission period. For example, if the SCS is 60 kHz in FR1, the transmitting UE may transmit 1, 2, or 4 S-SSBs to the receiving UE within one S-SSB transmission period.

For example, if the SCS is 60 kHz in FR2, the transmitting UE may transmit 1, 2, 4, 8, 16, or 32 S-SSBs to the receiving UE within one S-SSB transmission period. For example, if the SCS is 120 KHz in FR2, the transmitting UE may transmit 1, 2, 4, 8, 16, 32, or 64 S-SSBs to the receiving UE within one S-SSB transmission period.

Meanwhile, if the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

Meanwhile, each SLSS may have an SL sidelink synchronization identifier (SLSS ID).

For example, in case of LTE SL or LTE V2X, a value of the SLSS ID may be defined based on a combination of 2 different S-PSS sequences and 168 different S-SSS sequences. For example, the number of SLSS IDs may be 336. For example, the value of the SLSS ID may be any one of values 0 to 335.

For example, in case of NR SL or NR V2X, the value of the SLSS ID may be defined based on a combination of 2 different S-PSS sequences and 336 different S-SSS sequences. For example, the number of SLSS IDs may be 672. For example, the value of the SLSS ID may be any one of values 0 to 671. For example, one S-PSS out of the 2 different S-PSSs may be associated/related with in-coverage, and the other S-PSS may be associated/related with out-of-coverage. For example, the SLSS IDs 0 to 335 may be used in the in-coverage, and the SLSS IDs 336 to 671 may be used in the out-of-coverage.

Meanwhile, a transmitting UE may need to optimize transmit power based on a characteristic of each signal constituting an S-SSB, to improve S-SSB reception performance of a receiving UE. For example, the transmitting UE may determine a maximum power reduction (MPR) value for each signal based on a peak to average power ratio (PAPR) of each signal constituting the S-SSB. For example, if the PAPR values are different between the S-PSS and S-SSS constituting the S-SSB, the transmitting UE may apply an optimal MPR value for each of the S-PSS and the S-SSS, to improve S-SSB reception performance of the receiving UE. In addition, for example, a transient period may be applied in order for the transmitting UE to perform an amplification operation for each signal. The transient period may preserve a time required when a transmitting-end amplifier of the transmitting UE performs a normal operation at a boundary at which transmit power of the transmitting UE varies. For example, in case of FR1, the transient period may be 10 us. For example, in case of FR2, the transient period may be 5 us. For example, a search window in which the receiving UE detects the S-PSS may be 80 ms and/or 160 ms.

Figure 4:
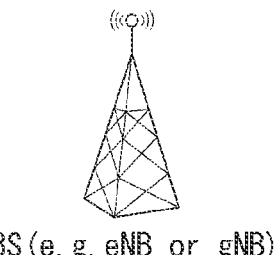
FIG. 4 shows a UE performing V2X or SL communication based on an embodiment of the present disclosure.
Figure 4:
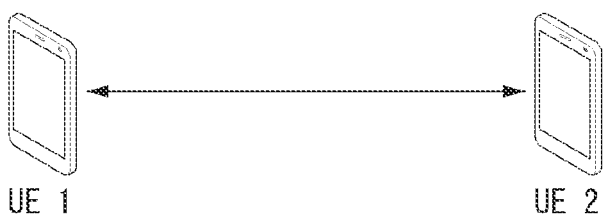

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 5:
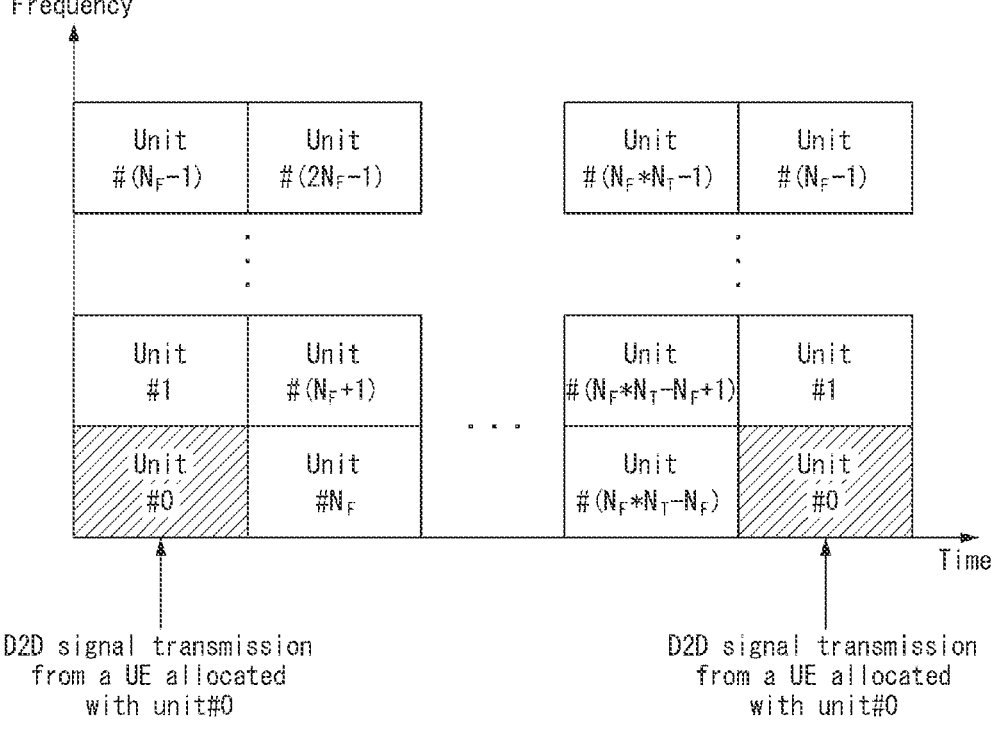
FIG. 5 shows a resource unit for V2X or SL communication based on an embodiment of the present disclosure.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a period of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, resource allocation in SL will be described.

Figure 6:
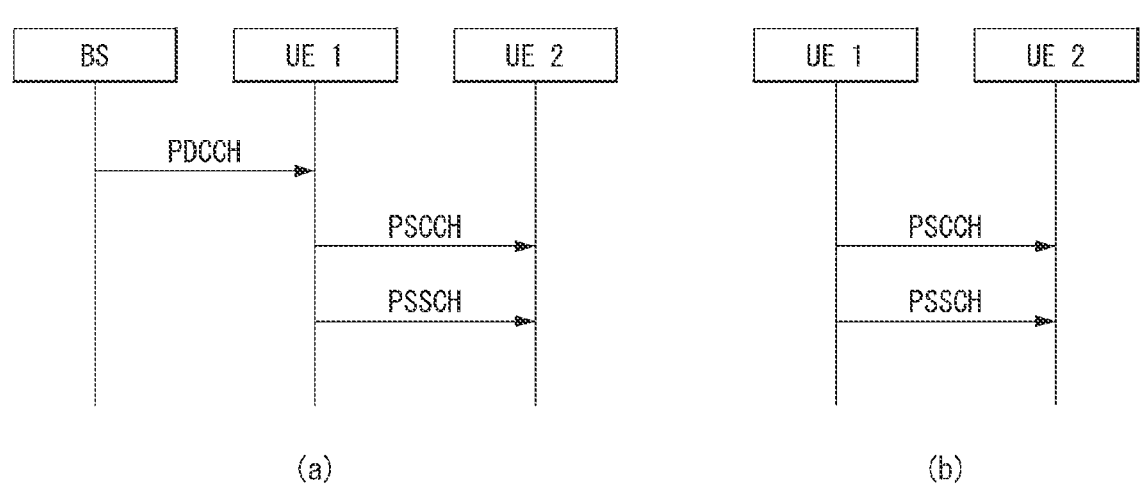
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type SA to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 6, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re)selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at $T1 \geq 0$, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting. UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Figure 7:
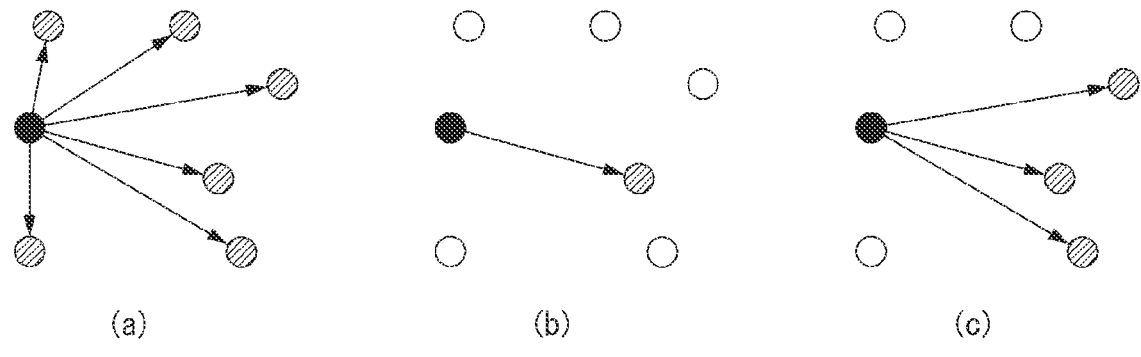
FIG. 7 shows three cast type based on an embodiment of the present disclosure.

Meanwhile, FIG. 7 shows three cast type based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

Figure 8:
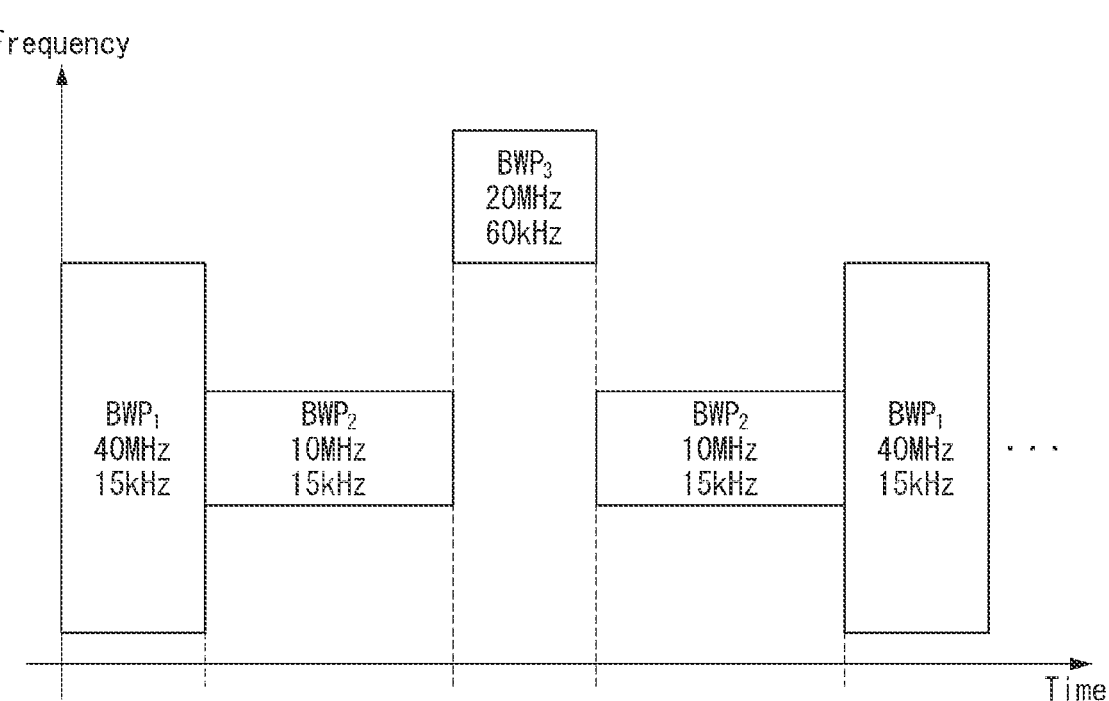
FIG. 8 shows a plurality of BWPs based on an embodiment of the present disclosure.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

Figure 9:
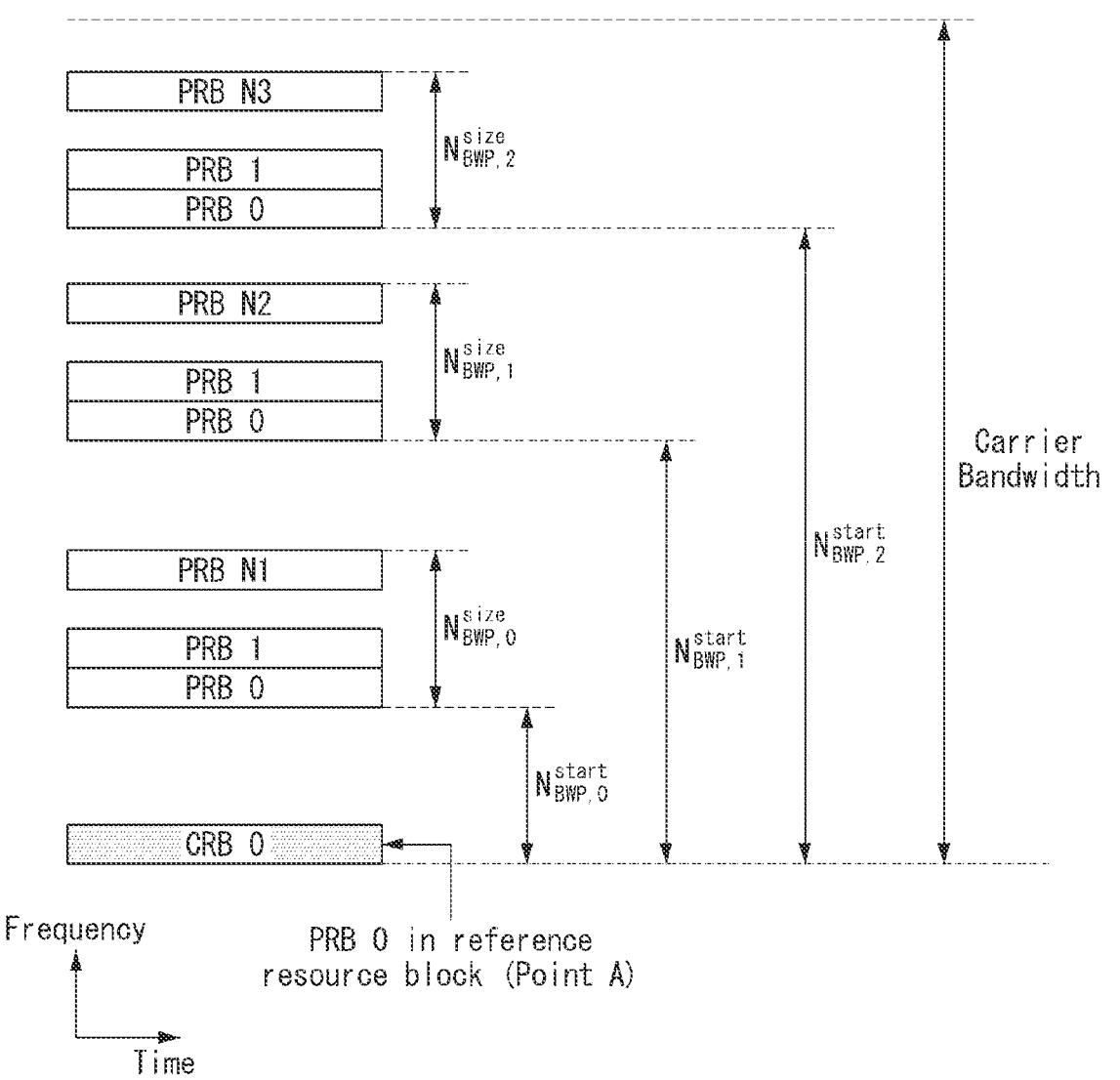
FIG. 9 shows a BWP based on an embodiment of the present disclosure.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-)configured to the UE in one carrier. From a perspective of a physical layer, the UE may perform unicast, groupcast, and broadcast communication by using the configured or pre-configured resource pool.

In the present disclosure, the wording "configuration or definition" may be interpreted as being configured (in advance) from a base station or network (via predefined signaling (e.g. SIB, MAC signaling, RRC signaling)). For example, "A may be configured" may include "the base station or network configures/defines or notifies (in advance) A for the UE". Alternatively, the wording "configuration or definition" may be interpreted as being configured or defined in advance by the system. For example, "A may be configured" may include "A is configured/defined in advance by the system".

For convenience of description below, in the present disclosure, the following abbreviations/acronyms may be used.

ACK/NACK—Acknowledgement/No Acknowledgement
AGC—Automatic Gain Control
AS—Access Stratum
CB—Codeblock
CBG/CG—Codeblock Group
CBR—Channel Busy Ratio
CE—Control Element
CFO—Carrier Frequency Offset
CG—Configured Grant
CP—Cyclic Prefix
CRC—Cyclic Redundancy Check
CSI—Channel State Information
CSI-RS—Channel State Information Reference Signal
DCI—Downlink Control Channel
DL—Downlink
DM-RS—Demodulation RS
ECP—Extended CP
FDD—Frequency Division Duplex
HARQ—Hybrid Automatic Repeat Request
L1—Layer 1
L2—Layer 2
LBS—Location Based Service
LCS—Location Service
LSB—Least Significant Bit
MAC—Medium Access Control
MCS—Modulation Coding Scheme
MIB—Master Information Block
MPR—Maximum Power Reduction
MSB—Most Significant Bit
NAS—Non-Access Stratum
NCP—Normal CP
NDI—New Data Indicator
PBCH—Physical Broadcast Channel
PDCCH—Physical Downlink Control Channel
PDCP—Packet Data Convergence Protocol
PDSCH—Physical Downlink Shared Channel
PDU—Protocol Data Unit
PRS—Positioning Reference Signal PSBCH—Physical Sidelink Broadcast Channel
PSCCH—Physical Sidelink Control Channel
PSFCH—Physical Sidelink Feedback Channel
PSS—Primary Synchronization Signal
PSSCH—Physical Sidelink Shared Channel
PUCCH—Physical Uplink Control Channel
PUSCH—Physical Uplink Shared Channel
QOS—Quality of Service
RB—Resource Block
RLC—Radio Link Control
RLM—Radio Link Monitoring
RLF—Radio Link Failure
RRC—Radio Resource Control
RS—Reference Signal
RSRP—Reference Signal Received Power
RSRQ—Reference Signal Received Quality
RSSI—Received Signal Strength Indicator
RSTD—Reference Signal Time Difference
RSU—Road Side Unit
RTT—Round Trip Time
RV—Redundancy Version
SCI—Sidelink Control Information
SCS—Sub-Carrier Spacing
SDAP—Service Data Adaptation Protocol
SIB—System Information Block
SL—Sidelink
SL OLPC—Open Loop Power Control
SL PL—Sidelink Pathloss
SLSSID—SL Synchronization Signal Identification
SNR—Signal-to-Noise Ratio
SPP—Sidelink Positioning Protocol
SPS—Semi-Persistent Scheduling
S-PSS—Sidelink PSS
SRS—Sounding Reference Signal
SSB—Synchronization Signal Block
SSS—Secondary Synchronization Signal
S-SSB—Sidelink SSB
S-SSS—Sidelink SSS
TB—Transport Block
TDD—Time Division Duplex
TDOA—Time Difference of Arrival
TOA—Time of Arrival
UE—User Equipment/End
UL—Uplink
Uu-PSS—Uu link PSS
Uu-SSS—Uu link SSS
XOR—Exclusive OR Meanwhile, in the present disclosure, for example, a transmitting UE (TX UE) may be a UE that transmits data to a (target) receiving UE (RX UE). For example, the TX UE may be a UE performing PSCCH and/or PSSCH transmission. And/or the TX UE may be a UE that transmits an SL CSI-RS and/or SL CSI report request indicator to the (target) RX UE. And/or the TX UE may be a UE that transmits a (control) channel (e.g. PSCCH, PSSCH, etc.) to be used for SL RLM and/or SL RLF operation of the (target) RX UE and/or a reference signal (e.g. DM-RS, CSI-RS, etc.) on the (control) channel.

Meanwhile, in the present disclosure, for example, the receiving UE (RX UE) may be a UE that transmits SL HARQ feedback to the TX UE according to whether decoding of data received from the transmitting UE (TX UE) is successful and/or according to whether detection/decoding of the PSCCH (related to PSSCH scheduling) transmitted by the TX UE is successful. And/or the RX UE may be a UE performing SL CSI transmission to the TX UE based on the SL CSI-RS and/or SL CSI report request indicator received from the TX UE. And/or the RX UE may be a UE that transmits the measured SL (L1) RSRP measurement value to the TX UE based on the (predefined) reference signal and/or SL (L1) RSRP report request indicator received from the TX UE. And/or the RX UE may be a UE that transmits its own data to the TX UE. And/or the RX UE may be a UE that performs SL RLM and/or SL RLF operations based on a (preset) (control) channel and/or a reference signal on the (control) channel received from the TX UE.

Meanwhile, in the present disclosure, for example, when the RX UE transmits SL HARQ feedback information for the PSSCH and/or PSCCH received from the TX UE, the following option or some of the following options may be considered. Here, for example, the following option or some of the following options may be limitedly applied only when the RX UE successfully decodes/detects the PSCCH scheduling the PSSCH.

Option 1) only if the RX UE fails to decode/receive the PSSCH received from the TX UE, it may transmit NACK information to the TX UE.

Option 2) if the RX UE succeeds in decoding/receiving the PSSCH received from the TX UE, it may transmit ACK information to the TX UE, and if the RX UE fails to decode/receive the PSSCH, it may transmit NACK information to the TX UE.

Meanwhile, in the present disclosure, for example, the TX UE may transmit the following information or some of the following information to the RX UE through SCI. Here, for example, the TX UE may transmit some or all of the following information to the RX UE through a first SCI (FIRST SCI) and/or a second SCI (SECOND SCI).

PSSCH (and/or PSCCH) related resource allocation information (e.g. time/frequency resource location/number, resource reservation information (e.g. period))

SL CSI report request indicator or SL (L1) RSRP (and/or SL (L1) RSRQ and/or SL (L1) RSSI) report request indicator SL CSI transmission indicator (on PSSCH) (or SL (L1) RSRP (and/or SL (L1) RSRQ and/or SL (L1) RSSI) information transmission indicator)

MCS information

TX POWER information

L1 DESTINATION ID information and/or L1 SOURCE ID information

SL HARQ PROCESS ID information

NDI information

RV information

QoS information (related to transmission TRAFFIC/PACKET) (e.g. PRIORITY information)

Information on the number of SL CSI-RS transmission indicators or (transmitted) SL CSI-RS antenna ports TX UE location information or location (or distance area) information of a target RX UE (for which SL HARQ feedback is requested)

Reference signal (e.g. DM-RS, etc.) information related to decoding (and/or channel estimation) of data transmitted through PSSCH. For example, it may be information related to a pattern of (time-frequency) mapping resources of a DM-RS, RANK information, antenna port index information, and the like.

Meanwhile, in the present disclosure, for example, since the TX UE may transmit SCI, first SCI (FIRST SCI) and/or second SCI (SECOND SCI) to the RX UE through the PSCCH, the PSCCH may be replaced/substituted with SCI and/or FIRST SCI and/or SECOND SCI. And/or the SCI may be replaced/substituted with PSCCH and/or FIRST SCI and/or SECOND SCI. And/or, for example, since the TX UE may transmit SECOND SCI to the RX UE through the PSSCH, the PSSCH may be replaced/substituted with SECOND SCI.

Meanwhile, in the present disclosure, for example, when the SCI configuration fields are divided into two groups in consideration of a (relatively) high SCI payload size, the first SCI including the first SCI configuration field group may be referred to as FIRST SCI, and the second SCI including a second SCI configuration field group may be referred to as SECOND SCI. Also, for example, the FIRST SCI may be transmitted to the receiving UE through the PSCCH. Also, for example, the SECOND SCI may be transmitted to the receiving UE through an (independent) PSCCH or may be piggybacked and transmitted together with data through the PSSCH.

On the other hand, in the present disclosure, for example, "configuration" or "definition" may mean (PRE) CONFIGURATION (resource pool specific) (via predefined signaling (e.g. SIB, MAC, RRC, etc.)) from a base station or network.

Meanwhile, in the present disclosure, for example, since the RLF may be determined based on the OUT-OF-SYNCH (OOS) indicator or the IN-SYNCH (IS) indicator, it may be replaced/substituted with OUT-OF-SYNCH (OOS) or IN-SYNCH (IS).

Meanwhile, in the present disclosure, for example, RB may be replaced/substituted with SUBCARRIER. Also, as an example, in the present invention, a packet (PACKET) or traffic (TRAFFIC) may be replaced/substituted with a TB or MAC PDU according to a transmitted layer.

Meanwhile, in the present disclosure, CBG or CG may be replaced/substituted with TB.

Meanwhile, in the present disclosure, for example, SOURCE ID may be replaced/substituted with DESTINATION ID.

Meanwhile, in the present disclosure, for example, an L1 ID may be replaced/substituted with an L2 ID. For example, the L1 ID may be an L1 SOURCE ID or an L1 DESTINATION ID. For example, the L2 ID may be an L2 SOURCE ID or an L2 DESTINATION ID.

On the other hand, in the present disclosure, for example, the operation of reserving/selecting/determining retransmission resources by the transmitting UE may refer to an operation of reserving/selecting/determining a potential retransmission resource for which actual use will be determined based on SL HARQ feedback information received by the transmitting UE from the receiving UE.

Meanwhile, in the present disclosure, SL MODE 1 may mean a resource allocation method or communication method in which a base station directly schedules sidelink transmission (SL TX) resources of a UE through predefined signaling (e.g. DCI). Also, for example, SL MODE 2 may mean a resource allocation method or communication method in which the UE independently selects SL TX resources within a resource pool configured or pre-configured from a base station or network.

Meanwhile, in the present disclosure, for example, for convenience of description, a (physical) channel used when the RX UE transmits at least one of the following information to the TX UE may be referred to as PSFCH.

SL HARQ feedback. SL CSI, SL (L1) RSRP

Meanwhile, the base station may allocate resources (hereinafter, SL resources) used for transmission and reception of SL channels/signals to the UE. For example, the base station may transmit information related to the resource to the UE. In the present disclosure, a method in which the base station allocates the SL resources to the UE may be referred to as mode 1 method, mode 1 operation, or resource allocation mode 1.

On the other hand, the UE may select the SL resource within the resource pool based on sensing. In the present disclosure, a method for selecting the SL resource by the UE may be referred to as a mode 2 method, a mode 2 operation, or a resource allocation mode 2. For example, in resource allocation mode 2, the UE may detect SCI transmitted by another UE, and/or the UE may identify a resource reserved by another UE based on the SCI, and/or the UE may obtain the RSRP measurement value. And/or, the UE may select a resource to be used for SL transmission excluding a specific resource within the resource selection window based on the above-described sensing result. In the case of the sensing operation, the UE may refer to resource allocation information received through the first SCI. However, due to the overhead of the first SCI, the amount of information that the UE can obtain on the first SCI may be limited.

According to various embodiments of the present disclosure, in order to assist a sensing operation and/or a resource selection operation of a first UE, a second UE may transmit additional assistance information. The first UE may use assistance information received from the second UE for PSSCH detection performance improvement and/or half-duplex limit reduction and/or reserve resource selection for transmission and reception of a specific signal, etc. In an embodiment of the present disclosure, for convenience of description, it is assumed that UE-A transmits assistance information to UE-B. It is assumed that UE-B selects a resource for PSCCH/PSSCH to be transmitted to UE-A and/or a resource for PSCCH/PSSCH to be transmitted to UE-C (i.e. a third UE) based on the assistance information received from the UE-A.

Figure 10:
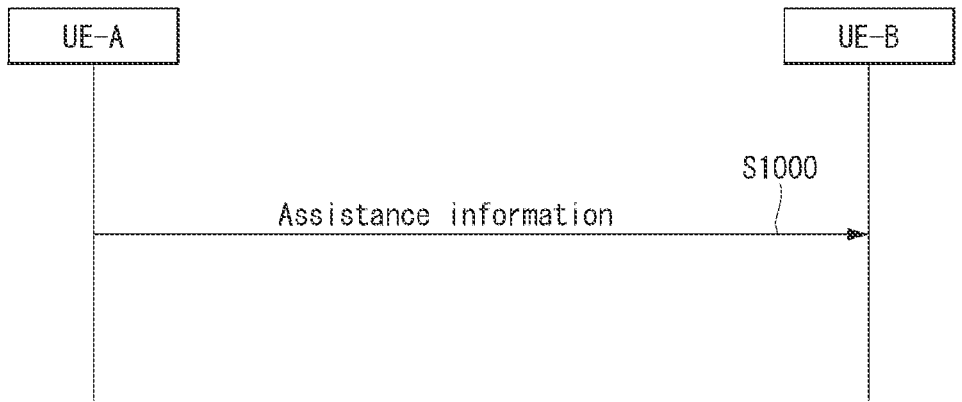
FIG. 10 illustrates a procedure for UE-A to transmit assistance information to UE-B according to an embodiment of the present disclosure.

FIG. 10 illustrates a procedure for UE-A to transmit assistance information to UE-B according to an embodiment of the present disclosure. The embodiment of FIG. 10 may be combined with various embodiments of the present disclosure.

Referring to FIG. 10, in step S1000, UE-A may transmit assistance information to UE-B. For example, UE-B (e.g. the first UE) may select a resource for a PSCCH/PSSCH to be transmitted to UE-A based on assistance information received from UE-A (e.g. the second UE). And/or, UE-B may perform SL transmission using the resource. For example, UE-B may select a resource for a PSCCH/PSSCH to be transmitted to UE-C based on assistance information received from UE-A, and UE-B may perform SL transmission using the resource. In the present disclosure, the assistance information may be referred to as additional information.

According to an embodiment of the present disclosure, UE-A may provide UE-B with preferred resources and/or non-preferred resources for future PSCCH/PSSCH transmission of UE-B and/or SL reception availability time resources of UE-A and/or SL reception unavailability time resource information of UE-A. And/or, UE-B may select a PSCCH/PSSCH resource to be transmitted to UE-A or UE-C based on this.

Meanwhile, transmission resource pools used between UEs may be different. And/or, transmission resource pool information used between UEs may not be shared with each other. In addition, a set of slots constituting a resource pool may be different from each other depending on a case in which the serving cells are different from each other even if the resource pool configuration value and/or ID is the same between UEs and/or IN-COVERAGE or OUT-OF-COVER- AGE, etc. In the above situation, it is necessary to determine the relationship between the resources and the resource pool delivered by UE-A to UE-B or in which resource domain the decision is made.

Therefore, the present disclosure proposes a method for time resources indicated by assistance information (hereinafter, the first embodiment), a method for frequency resources indicated by assistance information (hereinafter, the second embodiment), and a method for transmitting and receiving requests for assistance information (hereinafter, the third embodiment).

Hereinafter, the embodiments described in the present disclosure are only divided for convenience of explanation, and it goes without saying that some methods and/or some configurations of one embodiment may be substituted with methods and/or configurations of other embodiments, or may be applied in combination with each other.

Slots, subframes, frames, etc. mentioned in the embodiments described in the present disclosure may correspond to specific examples of certain time units used in a wireless communication system. That is, when applying the methods proposed in the present disclosure, time units, etc. may be replaced with other time units applied in another wireless communication system.

In the present disclosure. L1 signaling may mean DCI-based dynamic signaling between the base station and the UE and L2 signaling may mean higher layer signaling based on radio resource control (RRC)/medium access control-control element (MAC-CE) between the base station and the UE.

The content discussed above (3GPP system, NR system, NR wireless frame structure/slot structure, etc.) may be applied in combination with the methods proposed in the present disclosure, which will be described later, and/or may be supplemented to clarify the technical characteristics of the methods proposed in the present disclosure.

In the present disclosure, '( )' may be interpreted both as excluding the content in ( ) and including the content in parentheses. And/or in the present disclosure, it goes without saying that '( )' may mean a group of elements (or content) within the parentheses, may mean an abbreviation/full name of the term before the parentheses, and/or may be the English text of the content before the parentheses.

In this disclosure, '/' may be interpreted both as including (and) all of the contents separated by / and as including (or) only part of the separated content.

First, let's start with the first embodiment.

First Embodiment

In the first embodiment, we look at a method for time resources indicated by assistance information.

The methods described below are only divided for convenience of explanation, and it goes without saying that the configuration of one method may be substituted with the configuration of another method, or may be applied in combination with each other.

Resources constituting a set of non-preferred resources and/or a set of preferred resources delivered by UE-A (e.g. a second UE) to UE-B (e.g. a first UE) and/or a set of time resources capable of receiving SL and/or a set of time resources incapable of receiving SL may be resources belonging to a specific resource pool. For example, the specific resource pool may include information about the resource pool in assistance information by UE-A to UE-B. For example, the specific resource pool may deliver information about the transmission resource pool to be used for UE-A's transmission packet when UE-B requests UE-A to transmit assistance information.

And/or, the resource constituting a set of non-preferred resources and/or a set of preferred resources delivered by UE-A (e.g. a second UE) to UE-B (e.g. a first UE) and/or a set of time resources capable of receiving SL and/or a set of time resources incapable of receiving SL may be a set of slots capable of SL transmission (e.g. a set of slots related to SL transmission). For example, the resources constituting a set of non-preferred resources and/or a set of preferred resources delivered by UE-A to UE-B and/or a set of time resources capable of receiving SL and/or a set of time resources incapable of receiving SL may be a resource included in a set of slots capable of SL transmission.

For example, the set of slots capable of SL transmission may be composed of slots in which the number of SL symbols is a cell-specific UL from the start SL symbol by (pre) configuration, or SL capable slots indicated by PSBCH. And/or, the set of slots capable of SL transmission may exclude slots for S-SSB and/or RESERVED slots derived when configuring a resource pool. For example, the set of slots capable of SL transmission may include slots for S-SSB and/or RESERVED slots derived when configuring a resource pool. In other words, the resource indicated by assistance information may be a set of slots that are the target of a bitmap when configuring a resource pool. In the above case, UE-A may indicate/deliver resources that can be used for resource (re)selection of UE-B regardless of the resource pool. And/or, UE-B may select resources to be used for PSSCH transmission by referring to/considering resources for the transmission resource pool corresponding to resource (re)selection in the received assistance information.

And/or, resources constituting a set of non-preferred resources and/or a set of preferred resources delivered by UE-A to UE-B and/or a set of time resources capable of receiving SL and/or a set of time resources incapable of receiving SL may be a set of physical slots.

Second Embodiment

In the second embodiment, let's look at a method for frequency resources indicated by assistance information.

The methods described below are divided for convenience of explanation, and it goes without saying that the configuration of one method may be replaced with the configuration of another method or applied in combination with each other.

Depending on the resource pool, the interpretation of frequency-side resources (or frequency resources/resources in the frequency domain) may also be different. Accordingly, it is necessary to determine by what criteria the resources indicated by the assistance information are determined. For example, the frequency-side resource indicated in the assistance information may be a resource belonging to a specific resource pool. For example, the specific resource pool may be delivered/configured by UE-A (e.g. second UE) to UE-B (e.g. first UE). And/or, information about the (specific) resource pool may be included in assistance information. And/or, the specific resource pool may deliver information about the transmission resource pool to be used for UE-A's transmission packet when UE-B requests UE-A to transmit assistance information. And/or, information about a specific resource pool may be delivered/transmitted along with information about the transmission resource pool to be used for UE-A's transmission packet when UE-B requests UE-A to transmit assistance information.

And/or, the frequency-side resources indicated in the assistance information (e.g. set of preferred resources/set of non-preferred resources) may be based on resources belonging to the SL BWP. For example, it may indicate an RB or RB group within the SL BWP, starting with the resource block (RB) of the smallest index constituting the SL BWP, and may be in the form of expressing a single or a plurality of subchannels after dividing the SL BWP into the plurality of subchannels based on a (pre)configured subchannel size. That is, the frequency resource indicated in the assistance information (e.g. set of preferred resources/set of non-preferred resources) may be indicated to the RB or RB group within the SL BWP, starting with the resource block (RB) with the smallest index constituting the SL BWP. And/or, the frequency resource indicated in the assistance information (e.g. set of preferred resources/set of non-preferred resources) may be indicated to a single or a plurality of subchannels after dividing the SL BWP into the plurality of subchannels based on a (pre) configured subchannel size.

According to various embodiments of the present disclosure, resources indicated in the assistance information may be indicated by a reference time point, a time offset from the reference point, a reference frequency position, a frequency offset from the reference position, etc. And/or, the resource indicated in the assistance information may be one in which the UE expresses/interprets the offset and reference time/position according to the time domain and/or frequency domain that are the standards for the resource indicated in the assistance information.

Third Embodiment

In the third embodiment, let's look at a method for transmitting and receiving requests for assistance information.

The methods described below are divided for convenience of explanation, and it goes without saying that the configuration of one method may be replaced with the configuration of another method or applied in combination with each other.

A specific UE (e.g. previous release UEs, Mode 1 resource allocation (RA) operating UEs, etc.) may not be able to use it in its own resource (re)selection process even when receiving assistance information from another UE. In this case, assistance information transmission may be unused and unnecessarily occupy resources.

For example, UE-B (e.g. a UE that can receive assistance information and use it to (re)select resources) may transmit a request for assistance information to UE-A in the case of a Release 17 or later UE and/or Mode 2 RA operation and/or when assistance information is available. And/or, the UE-B may be different in whether it can request assistance information depending on a congestion control level and/or transmission priority and/or (remaining) Packet Delay Budget (PDB) value and/or service type and/or transmission Modulation and Coding Scheme (MCS) value and/or transmission TX power and/or Quality of Service (QOS) parameters and/or Transport Block (TB). And/or, the request information may be indicated using a specific value of the reservation field of the first SCI. And/or, the request information may be transmitted through the second SCI and/or PSSCH.

And/or, UE-B may inform UE-A whether assistance information is available through PC5-RRC (radio resource control) connection between UE-A and UE-B. For example, UE-B may determine whether to receive assistance information from UE-A through PC5-RRC connection between UE-A and UE-B. This is to prevent any UE from becoming the UE-A and maliciously transmitting incorrect assistance information.

Figure 11:
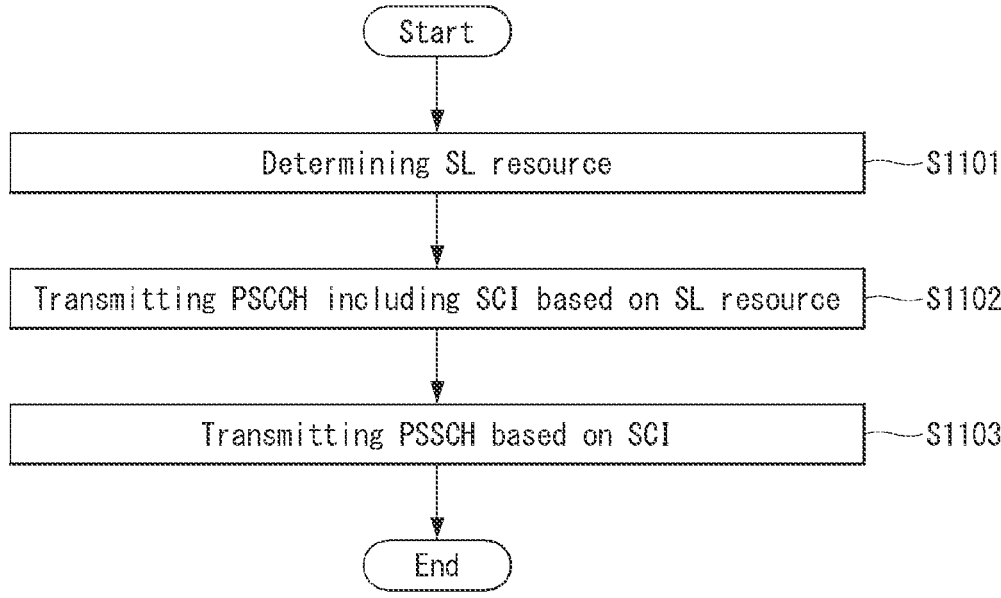
FIG. 11 is a flowchart for explaining an operation method of a first UE proposed in the present disclosure.

FIG. 11 is a flowchart for explaining an operation method of a first UE proposed in the present disclosure.

Referring to FIG. 11, first, in step S1101, the first UE (100/200 in FIGS. 13 to 18) may determine a sidelink (SL) resource based on a set of preferred resources or a set of non-preferred resources related to the second UE. In the present disclosure, 'a set of preferred resources or a set of non-preferred resources' may be replaced/substituted with 'at least one of a set of preferred resources and/or a set of non-preferred resources'. And/or, 'a set of preferred resources or a set of non-preferred resources' may be replaced/substituted with 'resources indicated/indicable by assistance information'. And/or, a set of preferred resources or a set of non-preferred resources related to the second UE may be a set of preferred resources of the second UE or a set of non-preferred resources of the second UE.

And/or, in the present disclosure, a UE' may be referred to as a 'device'. For example, a 'first UE' may be referred to as a 'first device' and a 'second UE' may be referred to as a 'second device'.

And/or, the set of preferred resources or the set of non-preferred resources may be included in a set of slots related to SL transmission in the time domain.

And/or, the slot set related to the SL transmission may not include at least one of a slot related to a synchronization signal block (SSB) and/or a reserved slot in the resource pool configuration. For example, the slot set related to SL transmission may be a slot set that does not include at least one of the slots related to SSB and/or the reserved slot in the resource pool configuration.

For example, the slot set may mean a set including a plurality of slots. And/or, a set of slots related to SL transmission may mean a set of slots capable of SL transmission. And/or, the slot set related to SL transmission may be composed of slots where the number of SL symbols is a cell-specific UL from the start SL symbol by (pre) configuration. And/or, the slot set related to SL transmission may be composed of SL-capable slots indicated by PSBCH.

For example, SSB may mean S-SSB. A detailed description of SSB/S-SSB may refer to the description described above in the present disclosure.

And/or, the first UE may receive assistance information including information about the set of preferred resources or the set of non-preferred resources from the second UE (e.g. see FIG. 10). For example, reception of assistance information may be performed before step S1101.

And/or, the set of preferred resources or the set of non-preferred resources may be included in the SL bandwidth part (BWP) in the frequency domain. The content of the BWP described with reference to FIGS. 8 and 9 may be referred to for detailed description of the SL BWP.

And/or, the set of preferred resources or the set of non-preferred resources may be configured based on the lowest index resource block (RB) included in the SL BWP. And/or the set of preferred resources or the set of non-preferred resources may be configured to at least one subchannel among a plurality of subchannels included in the SL BWP.

Other detailed descriptions and/or methods that can be combined/replaced/substituted may refer to the first to second embodiments.

And/or, the first UE may request assistance information from the second UE based on the first UE having the assistance information available, or based on the first UE operating in sidelink resource allocation mode 2. For example, the request for assistance information may be performed before reception operation of the assistance information.

Other detailed descriptions and/or methods that can be combined/replaced/substituted may refer to the third embodiment.

For example, the operation of the first UE determining the SL resource in step S1101 may be implemented by the device of FIGS. 13 to 18 described above. For example, referring to FIG. 14, one or more processors 102/202 may control one or more memories 104/204 and/or one or more transceivers 106/206, etc. to determine the SL resource.

And/or, in step S1102, the first UE (100/200 in FIGS. 13 to 18) may transmit a physical sidelink control channel (PSCCH) including sidelink control information (SCI) to the second UE based on the SL resource. For example, the second UE may be replaced/substituted by one or more UEs. That is, the first UE may perform the communication in FIGS. 7 (*a*) to 7 (*c*).

For example, the operation of the first UE transmitting the PSCCH in step S1102 may be implemented by the device of FIGS. 13 to 18 described above. For example, referring to FIG. 14, one or more processors 102/202 may control one or more memories 104/204 and/or one or more transceivers 106/206, etc. to transmit the PSCCH.

And/or, the first UE (100/200 in FIGS. 13 to 18) may transmit the PSSCH to the second UE based on the SCI in step S1103.

For example, the first UE may operate in the resource allocation mode in FIG. 6 (*b*). For example, the first UE may operate in resource allocation mode 2. The resource allocation operation of the first UE may refer to the operation described with reference to FIG. 6.

For example, a specific description of SCI/PSCCH/PSSCH may refer to the description described above in the present disclosure. And/or, the operation method of the first UE may refer to the operations described with reference to FIGS. 1 to 5.

For example, the operation of the first UE transmitting the PSSCH in step S1103 may be implemented by the device of FIGS. 13 to 18 described above. For example, referring to FIG. 14, one or more processors 102/202 may control one or more memories 104/204 and/or one or more transceivers 106/206, etc. to transmit the PSSCH.

Since the operation of the first UE described with reference to FIG. 11 is the same as the operation of the first UE described with reference to FIGS. 1 to 10 (e.g. first to third embodiments), detailed descriptions other than this will be omitted.

The signaling and operations described above may be implemented by devices to be described below (e.g. FIGS. 13 to 18). For example, the signaling and operations described above may be processed by one or more processors of FIGS. 13 to 18, and the signaling and operations described above may be stored in memory in the form of instructions/programs (e.g. instruction, executable code) for driving at least one processor of FIGS. 13 to 18.

For example, a processing apparatus configured to control a first user equipment (UE) to transmit a PSSCH in a wireless communication system, the processing apparatus may comprise at least one processor, and at least one memory operably connected to the at least one processor, and storing instructions for performing operations based on being executed by the at least one processor, wherein the operations may include determining an SL resource based on a set of preferred resources or a set of non-preferred resources related to a second user equipment (UE), wherein the set of preferred resources or the set of non-preferred resources is included in a slot set related to SL transmission in time domain, and the slot set related to the SL transmission does not include at least one of a slot related to an SSB and/or a reserved slot in a resource pool configuration, transmitting a PSCCH including SCI to the second UE based on the SL resource, and transmitting the PSSCH to the second UE based on the SCI.

As another example, a computer-readable storage medium storing at least one instruction, wherein the least one instruction causes at least one processor to control operations based on being executed by the at least one processor, wherein the operations may include determining an SL resource based on a set of preferred resources or a set of non-preferred resources related to a user equipment (UE) (e.g. a second UE), wherein the set of preferred resources or the set of non-preferred resources is included in a slot set related to SL transmission in time domain, and the slot set related to the SL transmission does not include at least one of a slot related to an SSB and/or a reserved slot in a resource pool configuration, transmitting a PSCCH including SCI to the UE based on the SL resource, and transmitting a (PSSCH to the UE based on the SCI.

Figure 12:
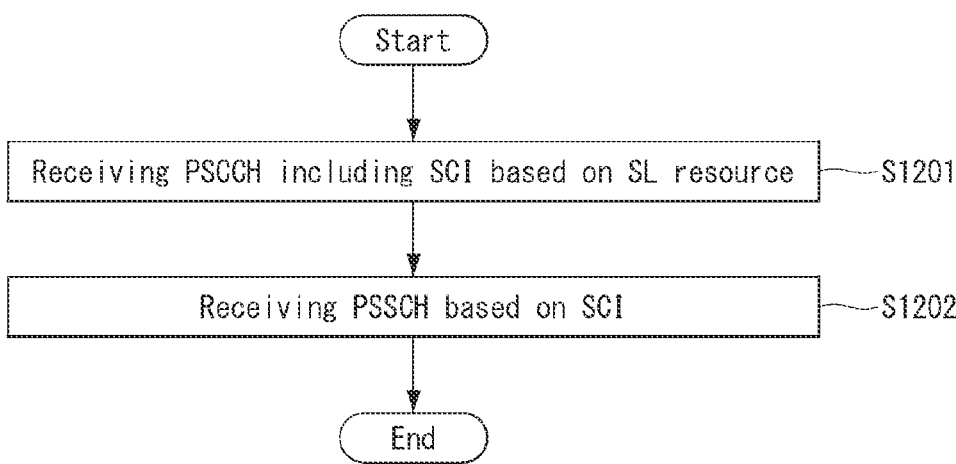
FIG. 12 is a flowchart for explaining an operation method of a second UE proposed in the present disclosure.

FIG. 12 is a flowchart for explaining an operation method of a second UE proposed in the present disclosure.

Referring to FIG. 12, first, a second UE (100/200 in FIGS. 13 to 18) may receive a physical sidelink control channel (PSCCH) including sidelink control information (SCI) from a first UE based on sidelink (SL) resources in step S1201. For example, the first UE may be replaced/substituted with one or more UEs. That is, the second UE may perform the communication in FIGS. 7 (*a*) to 7 (*c*).

And/or, in the present disclosure, a 'UE' may be referred to as a 'device'. For example, a first UE' may be referred to as a 'first device' and a 'second UE' may be referred to as a 'second device'.

And/or, the SL resource may be determined based on a set of preferred resources or a set of non-preferred resources related to the second UE. And/or, the set of preferred resources or the set of non-preferred resources may be included in a set of slots related to SL transmission in the time domain. And/or, the slot set related to the SL transmission may not include at least one of a slot related to a synchronization signal block (SSB) and/or a reserved slot in the resource pool configuration.

In the present disclosure, 'a set of preferred resources or a set of non-preferred resources' may be replaced/substituted with 'at least one of a set of preferred resources and/or a set of non-preferred resources'. And/or, 'a set of preferred resources or a set of non-preferred resources' may be replaced/substituted with 'resources indicated/indicable by assistance information'. And/or, a set of preferred resources or a set of non-preferred resources related to the second UE may be a set of preferred resources of the second UE or a set of non-preferred resources of the second UE.

For example, the slot set related to SL transmission may be a slot set that does not include at least one of the slots related to SSB and/or the reserved slot in the resource pool configuration.

For example, the slot set may mean a set including a plurality of slots. And/or, a set of slots related to SL transmission may mean a set of slots capable of SL transmission. And/or, the slot set related to SL transmission may be composed of slots where the number of SL symbols is a cell-specific UL from the start SL symbol by (pre) configuration. And/or, the slot set related to SL transmission may be composed of SL-capable slots indicated by PSBCH.

For example, SSB may mean S-SSB. A detailed description of SSB/S-SSB may refer to the description described above in the present disclosure.

For example, the operation of the second UE receiving the PSCCH in step S1301 may be implemented by the device of FIGS. 13 to 18 described above. For example, referring to FIG. 14, one or more processors 102/202 may control one or more memories 104/204 and/or one or more transceivers 106/206, etc. to receive the PSCCH.

And/or, the second UE may transmit assistance information including information about the set of preferred resources or the set of non-preferred resources to the first UE (e.g. see FIG. 10). For example, transmission of assistance information may be performed before step S1101.

And/or, the set of preferred resources or the set of non-preferred resources may be included in the SL bandwidth part (BWP) in the frequency domain. The content of the BWP described with reference to FIGS. 8 and 9 may be referred to for detailed description of the SL BWP.

And/or, the set of preferred resources or the set of non-preferred resources may be configured based on the lowest index resource block (RB) included in the SL BWP. And/or the set of preferred resources or the set of non-preferred resources may be configured to at least one subchannel among a plurality of subchannels included in the SL BWP.

Other detailed descriptions and/or methods that can be combined/replaced/substituted may refer to the first to second embodiments.

And/or, the second UE may receive a request for assistance information from the first UE based on the first UE having the assistance information available, or based on the first UE operating in sidelink resource allocation mode 2. For example, reception of a request for assistance information may be performed before the transmission operation of the assistance information.

Other detailed descriptions and/or methods that can be combined/replaced/substituted may refer to the third embodiment.

And/or, the second UE (100/200 in FIGS. 13 to 18) may receive the PSSCH from the first UE based on the SCI in step S1302.

For example, the second UE may operate in the resource allocation mode in FIG. 6 (*b*). For example, the second UE may operate in resource allocation mode 2. The resource allocation operation of the second UE may refer to the operation described with reference to FIG. 6.

For example, a specific description of SCI/PSCCH/PSSCH may refer to the description described above in the present disclosure. And/or, the operation method of the second UE may refer to the operations described with reference to FIGS. 1 to 5.

For example, the operation of the second UE receiving the PSSCH in step S1302 may be implemented by the device of FIGS. 13 to 18 described above. For example, referring to FIG. 14, one or more processors 102/202 may control one or more memories 104/204 and/or one or more transceivers 106/206, etc. to receive the PSSCH.

Since the operation of the second UE described with reference to FIG. 12 is the same as the operation of the second UE described with reference to FIGS. 1 to 11 (e.g. first to third embodiments), detailed descriptions other than this will be omitted.

The signaling and operations described above may be implemented by devices to be described below (e.g. FIGS.

13 to 18). For example, the signaling and operations described above may be processed by one or more processors of FIGS. 13 to 18, and the signaling and operations described above may be stored in memory in the form of instructions/programs (e.g. instruction, executable code) for driving at least one processor of FIGS. 13 to 18.

For example, a processing apparatus configured to control a second user equipment (UE) to receive a PSSCH in a wireless communication system, the processing apparatus may comprise at least one processor, and at least one memory operably connected to the at least one processor, and storing instructions for performing operations based on being executed by the at least one processor, wherein the operations may include receiving a PSCCH including SCI from a first user equipment (UE) based on SL resource, wherein the SL resource is determined based on a set of preferred resources or a set of non-preferred resources related to the second UE, the set of preferred resources or the set of non-preferred resources is included in a slot set related to SL transmission in time domain, and the slot set related to the SL transmission does not include at least one of a slot related to an SSB and/or a reserved slot in a resource pool configuration, and receiving the PSSCH from the first UE based on the SCI.

As another example, a computer-readable storage medium storing at least one instruction, wherein the least one instruction causes at least one processor to control operations based on being executed by the at least one processor, wherein the operations may include receiving a PSCCH including SCI from a first user equipment (UE) based on sidelink (SL) resource, wherein the SL resource is determined based on a set of preferred resources or a set of non-preferred resources related to the second UE, the set of preferred resources or the set of non-preferred resources is included in a slot set related to SL transmission in time domain, and the slot set related to the SL transmission does not include at least one of a slot related to a SSB and/or a reserved slot in a resource pool configuration, and receiving the PSSCH from the first UE based on the SCI Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
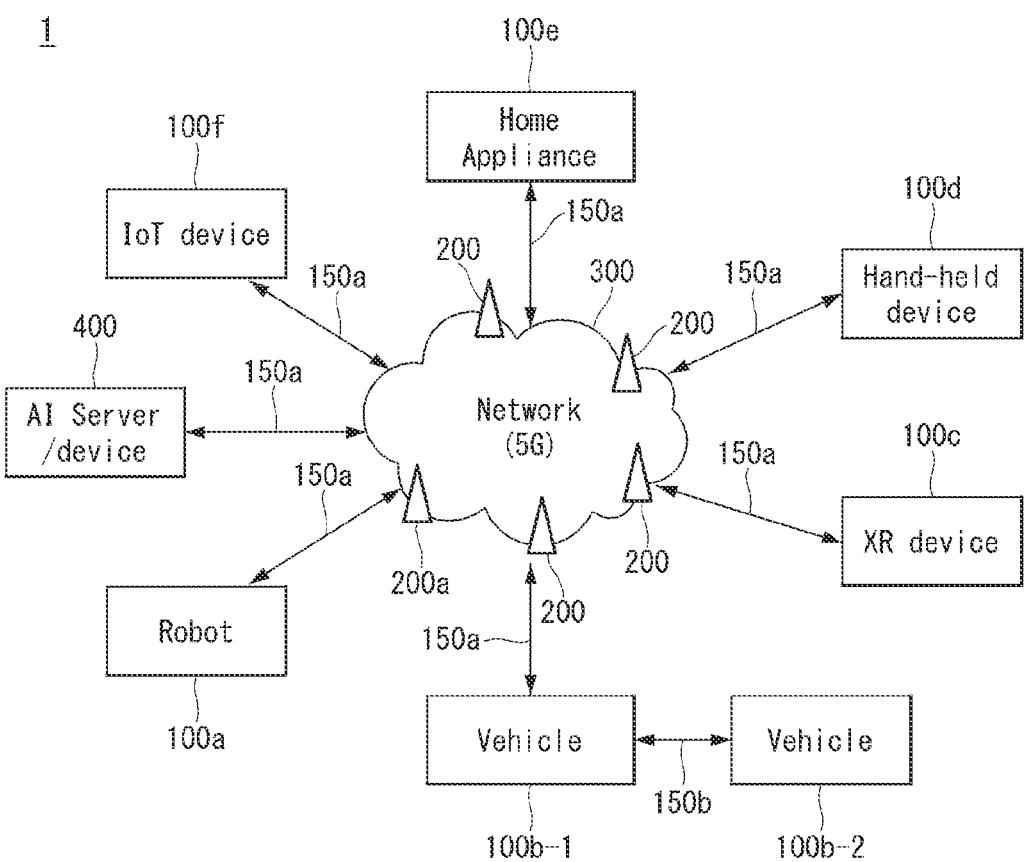
FIG. 13 shows a communication system 1 based on an embodiment of the present disclosure.

FIG. 13 shows a communication system 1 based on an embodiment of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a. 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
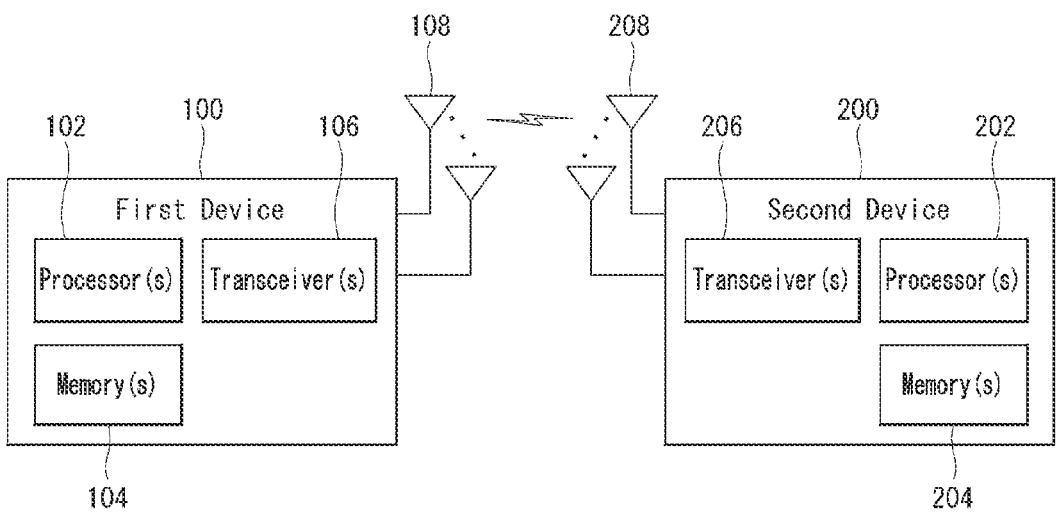
FIG. 14 shows wireless devices based on an embodiment of the present disclosure.

FIG. 14 shows wireless devices based on an embodiment of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data control information, radio signals/channels, etc. processed using the one or more processors 102 and 202 from the base band signals into the RF band signals. To this end, the one or more transceivers 106 and 206 may include (analog) oscillators and/or filters.

Figure 15:
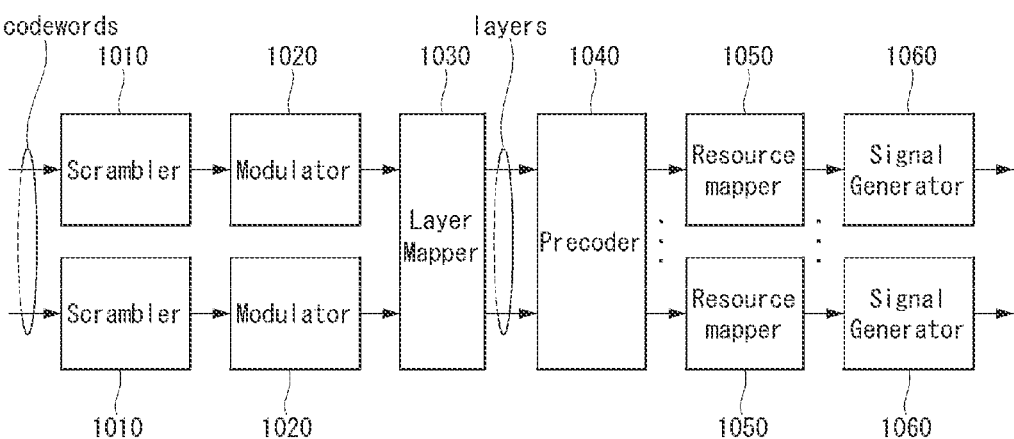
FIG. 15 shows a signal process circuit for a transmission signal based on an embodiment of the present disclosure.

FIG. 15 shows a signal process circuit for a transmission signal based on an embodiment of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 16 shows another example of a wireless device based on an embodiment of the present disclosure. The wireless device may be implemented in various forms based on a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place based on a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
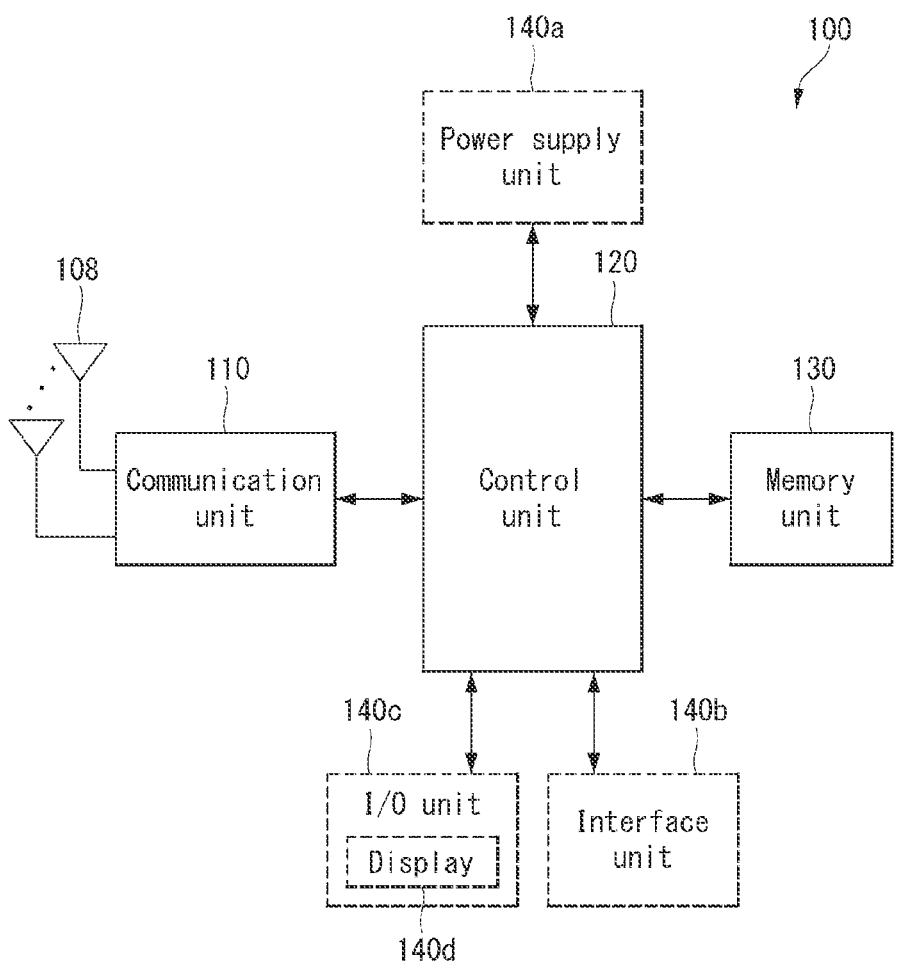
FIG. 17 shows a hand-held device based on an embodiment of the present disclosure.

FIG. 17 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit

110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 18:
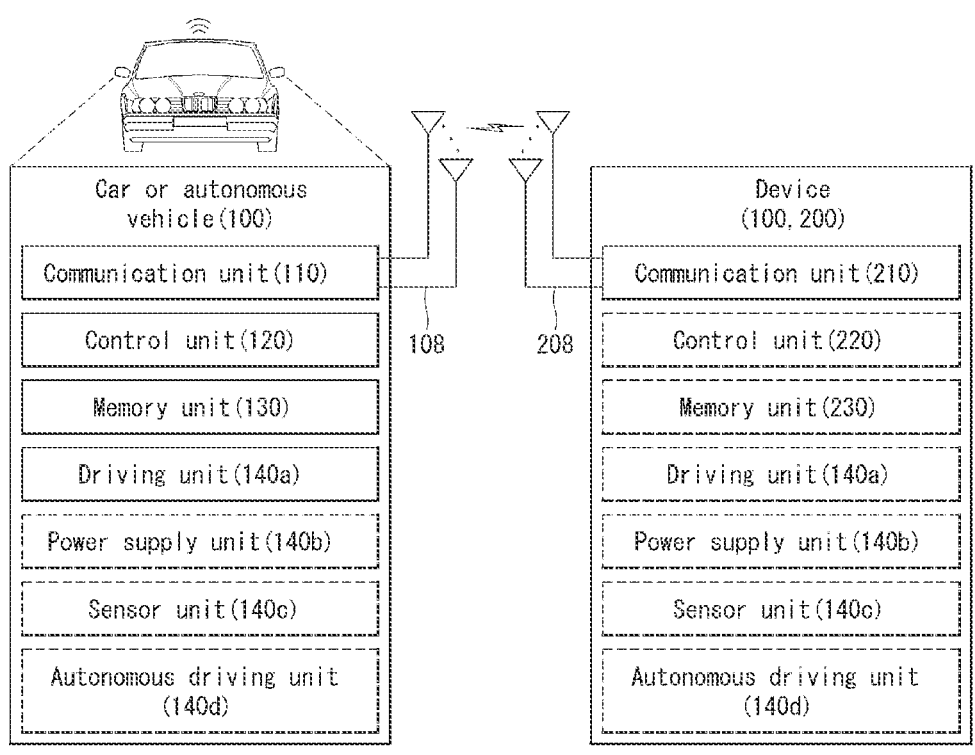
FIG. 18 shows a vehicle or an autonomous vehicle based on an embodiment of the present disclosure.

FIG. 18 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 18, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The wireless communication technology implemented in the wireless device (100, 200) of the present disclosure may include LTE, NR, and 6G as well as Narrowband Internet of Things for low-power communication. In this case, for example, the NB-IOT technology may be an example of a LPWAN (Low Power Wide Area Network) technology, and may be implemented in standards such as LTE Cat NB1 and/or LTE Cat NB2, and is not limited to the above-described name. Additionally or alternatively, the wireless communication technology implemented in the wireless device (100, 200) of the present disclosure may perform communication based on the LTE-M technology. In this case, for example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device (100, 200) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for transmitting and receiving the PSSCH in the wireless communication system of the present disclosure has been mainly described as an example applied to the 3GPP LTE/LTE-A system and the 5G system (New RAT system), but in addition, it is possible to apply to various wireless communication systems such as Beyond 5G, 6G, and Beyond 6G.

The invention claimed is:

1. A method comprising:

determining, by a first user equipment (UE), a sidelink (SL) resource based on a set of preferred resources or a set of non-preferred resources related to a second UE;

transmitting a sidelink control channel including sidelink control information (SCI) to the second UE based on the SL resource; and transmitting a sidelink shared channel to the second UE based on the SCI, wherein the set of preferred resources or the set of non-preferred resources is i) included in a slot set related to SL transmission in time domain, and ii) included in an SL bandwidth part (BWP) in frequency domain, wherein the slot set related to the SL transmission corresponds to a set of slots capable of the SL transmission, determined based on i) resource pool configuration including information for reserved slots and ii) presence of synchronization signal block (SSB), and wherein the set of preferred resources or the set of non-preferred resources is configured based on a resource block (RB) of a lowest index included in the SL BWP, or to at least on subchannel among a plurality of subchannels included in the SL BWP.

2. The method of claim 1, further comprising:

receiving assistance information including information for the set of preferred resources or the set of non-preferred resources from the second UE.

3. The method of claim 2, further comprising:

requesting the assistance information to the second UE based on availability of the assistance information by the first UE, or based on the first UE operating in sidelink resource allocation mode 2.

4. A first user equipment (UE) comprising:

at least one transceiver;

at least one processor; and at least one memory operably connected to the at least one processor, and storing instructions for performing operations based on being executed by the at least one processor, wherein the operations include:

determining a sidelink (SL) resource based on a set of preferred resources or a set of non-preferred resources related to a second UE;

transmitting a sidelink control channel including sidelink control information (SCI) to the second UE based on the SL resource; and transmitting a sidelink shared channel to the second UE based on the SCI, wherein the set of preferred resources or the set of non-preferred resources is i) included in a slot set related to SL transmission in time domain, and ii) included in an SL bandwidth part (BWP) in frequency domain, wherein the slot set related to the SL transmission corresponds to a set of slots capable of the SL transmission, determined based on i) resource pool configuration including information for reserved slots and ii) presence of synchronization signal block (SSB), and wherein the set of preferred resources or the set of non-preferred resources is configured based on a resource block (RB) of a lowest index included in the SL BWP, or to at least on subchannel among a plurality of subchannels included in the SL BWP.

5. The first UE of claim 4, further comprising:

receiving assistance information including information for the set of preferred resources or the set of non-preferred resources from the second UE.

6. A method comprising:

receiving a sidelink control channel including sidelink control information (SCI) from a first user equipment (UE) based on sidelink (SL) resource; and receiving the sidelink control channel from the first UE based on the SCI, wherein the SL resource is determined based on a set of preferred resources or a set of non-preferred resources related to a second UE, wherein the set of preferred resources or the set of non-preferred resources is i) included in a slot set related to SL transmission in time domain, and ii) included in an SL bandwidth part (BWP) in frequency domain, wherein the slot set related to the SL transmission corresponds to a set of slots capable of the SL transmission, determined based on i) resource pool configuration including information for reserved slots and ii) presence of synchronization signal block (SSB), and wherein the set of preferred resources or the set of non-preferred resources is configured based on a resource block (RB) of a lowest index included in the SL BWP or to at least one subchannel among a plurality of subchannels included in the SL BWP.

7. The method of claim 6, further comprising:

transmitting, by the second UE, assistance information including information for the set of preferred resources or the set of non-preferred resources to the first UE.

8. The method of claim 7, further comprising:

receiving a request for the assistance information from the first UE based on availability of the assistance information by the first UE, or based on the first UE operating in sidelink resource allocation mode 2.

* * * * *